United States Patent [19]
Paton et al.

[11] 4,352,509
[45] Oct. 5, 1982

[54] DAMPED RUBBER TIRED VEHICLE SUSPENSION

[75] Inventors: H. Neil Paton, 2521 W. Montlake Pl. East, Seattle, Wash. 98112; E. Frederick Gylland, Jr.; Jeffrey P. Sandys, both of Seattle, Wash.; John B. Skilling, 3000 Webster Point Rd., Seattle, Wash. 98105

[73] Assignees: H. Neil Paton; John B. Skilling, both of Seattle, Wash.

[21] Appl. No.: 83,756

[22] Filed: Oct. 11, 1979

Related U.S. Application Data

[62] Division of Ser. No. 870,500, Jan. 18, 1978, abandoned.

[51] Int. Cl.³ .................. B60G 13/02; B61F 5/34; B61F 5/52
[52] U.S. Cl. .................. 280/716; 105/197 A; 267/8 R; 267/9 B; 267/9 C; 280/81 B; 280/690
[58] Field of Search .............. 105/3, 4 A, 4 R, 182 R, 105/197 D, 199 S, 218 A, 224 R, 224 A, 224.1, 167; 280/680, 690, 697, 715, 716, 81 A, 81 B, 681, 797; 295/31 R; 403/225; 267/8 R, 9 A, 9 B, 9 C, 9 R; 213/29, 24, 34

[56] References Cited

U.S. PATENT DOCUMENTS

| | | | |
|---|---|---|---|
| Re. 20,030 | 7/1936 | Ledwinka | 280/797 |
| 148,618 | 3/1874 | McCarthy | 105/224.1 |
| 769,841 | 9/1904 | Shepard | 213/29 |
| 1,962,893 | 6/1934 | Christianson | 105/182 R |
| 2,009,349 | 7/1935 | Tarbox | 295/31 A |
| 2,059,963 | 11/1936 | Barrows | 105/224 R |
| 2,098,459 | 11/1937 | McWhirter | 105/182 R |
| 2,197,727 | 4/1940 | Ledwinka | 105/182 R |
| 2,295,553 | 9/1942 | Cottrell | 105/197 D |
| 2,295,554 | 9/1942 | Cottrell | 267/9 A |
| 2,352,030 | 6/1944 | Sproul | 267/9 A |
| 2,355,783 | 4/1944 | Dorey | 267/9 A |
| 2,356,743 | 8/1944 | Light | 267/9 A |
| 2,357,619 | 9/1944 | Tack | 105/224 R X |
| 2,361,496 | 10/1944 | Pointer | 105/218 A X |
| 2,381,404 | 8/1945 | Cottrell | 267/9 A |
| 2,439,937 | 4/1948 | Krob | 267/9 A |
| 2,497,829 | 2/1950 | Baselt | 267/9 C |
| 2,545,591 | 3/1951 | Shaw | 105/197 D |
| 2,549,036 | 4/1951 | Withall | 213/34 X |
| 2,552,668 | 5/1951 | Dath | 213/24 X |
| 2,863,401 | 12/1958 | Furrer | 105/4 A |
| 3,315,979 | 4/1967 | Chalmers | 280/681 |
| 3,792,871 | 2/1974 | Chalmers | 280/681 |
| 3,835,789 | 9/1974 | Sinclair | 105/218 A X |
| 3,856,325 | 12/1974 | Willetts | 403/225 |
| 3,948,188 | 4/1976 | Zehnder | 105/167 |
| 3,961,582 | 6/1976 | Paton et al. | 105/4 R X |
| 3,961,584 | 6/1976 | Paton et al. | 105/182 R |
| 3,984,125 | 10/1976 | Paton et al. | 280/716 |
| 4,109,934 | 8/1978 | Paton et al. | 280/716 |

*Primary Examiner*—Joseph F. Peters, Jr.
*Assistant Examiner*—Howard Beltran
*Attorney, Agent, or Firm*—Dowrey & Cross

[57] ABSTRACT

The suspension includes a moveable load arm assembly adapted to support a vehicle axle, at least one elliptical cross-section rod spring carried by the load arm assembly in load bearing relation with a vehicle body, a frictional damping surface connected to the body adjacent the load arm assembly, a frictional damping element, and a tapered operator carried by the load arm assembly in underlying relation with each rod spring such that one component of a load bearing force transmitted from the load arm assembly is applied to the rod spring as a transverse load bearing compressive force only, while a perpendicular component thereof is applied to and urges the damping element toward the friction surface. The suspension is suited for usage in railcar and rubber tired vehicle suspensions.

20 Claims, 30 Drawing Figures

DAMPED RUBBER TIRED VEHICLE SUSPENSION

RELATED U.S. APPLICATION DATA

This is a divisional of Application Ser. No. 870,500, filed Jan. 18, 1978, now abandoned.

BACKGROUND OF THE INVENTION

This invention relates to vehicle suspensions and to railcar and rubber tired vehicles equipped therewith. The invention is illustrated and described herein with reference to specific railcar and rubber tired vehicle suspensions; however, the invention is not limited to the specific suspensions illustrated and described hrerin and may be utilized in other vehicle suspension applications and environments.

The rubber tired vehicle suspension disclosed in the U.S. Pat. No. 3,984,125 and the railcar suspensions disclosed in U.S. Pat. Nos. 3,961,582 and 3,961,584 include multiple generally circular cross-section rod springs as the main load bearing and frictional damper spring elements.

A primary object of this invention is to provide a vehicle suspension which includes an improved rod spring and frictional damper.

Another object of this invention is to provide a vehicle suspension which, for given load and frequency conditions, is lighter in weight than suspensions which utilize circular cross-section rod springs or conventional elastomeric compression springs.

A further object of this invention is to provide a vehicle suspension of the type described which includes a single rod spring as both the main load bearing and frictional damper spring element.

A still further object of this invention is to provide a vehicle suspension of the type described which includes a rod spring affording a lower suspension frequency for a given amount of elastomeric material than heretofore possible using circular cross-section rod springs, or conventional elastomeric compression springs.

Another object of this invention is to provide a vehicle suspension of the type described which affords a substantially constant frequency over a predetermined load range.

Still another object of this invention is to provide a vehicle suspension of the type described which affords self-steering when negotiating a curve.

An object of this invention which is related to that just stated is to provide a self-steering railcar truck of double axle, single axle, or articulated single axle construction.

A still further object of this invention is to provide a vehicular suspension of the type described which includes a frictional damper, preferably of the variable rate type, having self-adjustment for wear so as to maintain essentially the same percentage efficiency throughout the service life of the wear material.

SUMMARY OF THE INVENTION

This invention provides a vehicle suspension which includes a spring element and a frictional damper operatively associated therewith such that a first component of a load bearing force is applied to the spring element as a load bearing compressive force, while a second component thereof is applied to and controls the frictional damper. According to one preferred embodiment of the invention wherein the spring element is constituted by an elliptical cross-section rod spring, an operator in load transmitting relation with the rod spring and frictional damper accomplishes simultaneous force application thereto. The operator is supported by a load bearing support surface and is so constructed and positioned with respect thereto that one component of a load bearing force applied to the support surface is applied to the rod spring along a fixed position force vector as a load bearing compressive force only, while simultaneously a second component thereof is applied to the frictional damper along a perpendicular force vector as a normal force.

In most practical applications, the upper rod spring load bearing surface bears against an appropriate load application surface formed by the vehicle body or an appropriate load application member mounted thereby. The operator and support surface are positioned in underlying load bearing vertical alignment with the rod spring, the operator intervening between the rod spring and support surface, although other alignments could be utilized. The support surface is formed by a load arm which constitutes a load bearing connection between the vehicle body and running gear, by a member mounted by the vehicle axle, or other appropriate means, depending upon the alignment of the rod spring, operator and damper.

The preferred operator is tapered in profile and forms upper and lower contact surfaces which diverge along the force vector associated with the damper normal force component applied thereby. The support surface is inclined and parallel to the lower contact surface. The upper operator contact surface is parallel to and interfaces with one rod spring load bearing surface, while the lower contact surface slidably engages the support surface. Consequently, shifting or lateral movement of the support surface in response to applied load bearing forces appears merely as sliding movement with respect to the lower contact surface and therefore is not transmitted to the upper contact surface. The operator further is so connected with the frictional damper that it maintains an essentially fixed position with respect thereto during force application. The upper operator contact surface thus remains in static interfacing contact with the rod spring during force application.

The preferred frictional damper is made up of two relatively moveable parallel friction surfaces in substantially perpendicular relation with the vector along which the aforementioned normal force component is applied by the operator. One friction surface is connected to and moveable conjointly with the operator such that, in response to application of the normal force component, it will be urged against the other friction surface to produce a variable rate frictional damping force.

Thus, it will be appreciated from the foregoing summary that this invention provides a vehicular suspension which yields economy, reliability and versatility heretofore unparalleled in the art of vehicular suspensions. For rubber tired vehicle tandem axle suspension application, for example, the vehicular suspension of this invention may include two pairs of independently moveable intermediately pivoted load arms, each pair associated with a single rod spring and frictional damper of the type described herein. In this and other rubber tired vehicle applications, the suspension of this invention equalizes load while reducing individual wheel bumps by about 50%; provides desirable dynamic qualities by controlling oscillations through proportional load variable damping; reduces shock loads by providing load variable damping; provides improved roll resistance; provides reliable extended service life through the use of rod springs; provides self-steering tendency when negotiating curves, thereby reducing tire wear due to scuffing at cornering speeds above equilibrium speeds and further reducing rolling resistance drag; provides stability under acceleration and and braking conditions, without wheel hop; provides a lower effective unsprung weight; and provides substantially constant frequency over most practical load ranges.

For railcar applications, the suspension of this invention affords many of these and other advantages. Utilizing independently moveable load arms and respectively associated rod springs and frictional dampers, the suspension provides a self-steering truck which, unlike prior four wheel trucks or articulated trucks, for example, maintains a lower angle of attack on curved track and tends to follow rail curves when running at overbalance speeds. That truck will self-steer on a spiral rail curve, or on other curves capable of causing the railcar to roll, or on turnouts or yard curves. The suspension of this invention for railcar application additionally cushions and absorbs shock loads at locations in close proximity to the rails and therefore exhibits highly desirable springing and cushioning for the railcar structure, the lading being carried and ancilliary components such as brake rigging and couplers.

In both rubber tired vehicle and railcar applications, the elliptical cross-section rod spring according to this invention is preferred because it yields lower suspension frequencies for given load conditions at significantly lighter weights than heretofore possible utilizing circular cross-section rod springs or conventional elastomeric compression springs. That spring further provides substantially constant suspension frequencies over given load ranges. In most practical applications associated with both rubber tired vehicle and railcar suspensions, it additionally provides virtually unbreakable, non-bottoming, non-linear springing and therefore yields highly effective yet versatile load bearing response to a broad range of load conditions from light loads to heavy or even shock loads. Consequently, damaging vertical accellerations are reduced or substantially minimized while affording superior ride qualities, even under bad road or track conditions, and at high speeds. It will be recognized, of course, that rod springs of other cross-sections or other types of springs, could be used in place of elliptical cross-section rod springs.

The variable rate frictional damper according to this invention is self-adjusting for wear throughout its entire wear-element service life with no performance reduction such as that which takes place in hydraulic shock absorbers and dampers or conventional friction snubbers wherein efficiency drops off in direct relation to wear of the friction damping surfaces.

These and other features, objects and advantages of the present invention will become apparent from the detailed description and claims to follow taken in conjunction with the accompanying drawings in which like parts bear like reference numerals.

DETAILED DESCRIPTION OF THE DRAWINGS

Figures 1, 2, 3, 4:
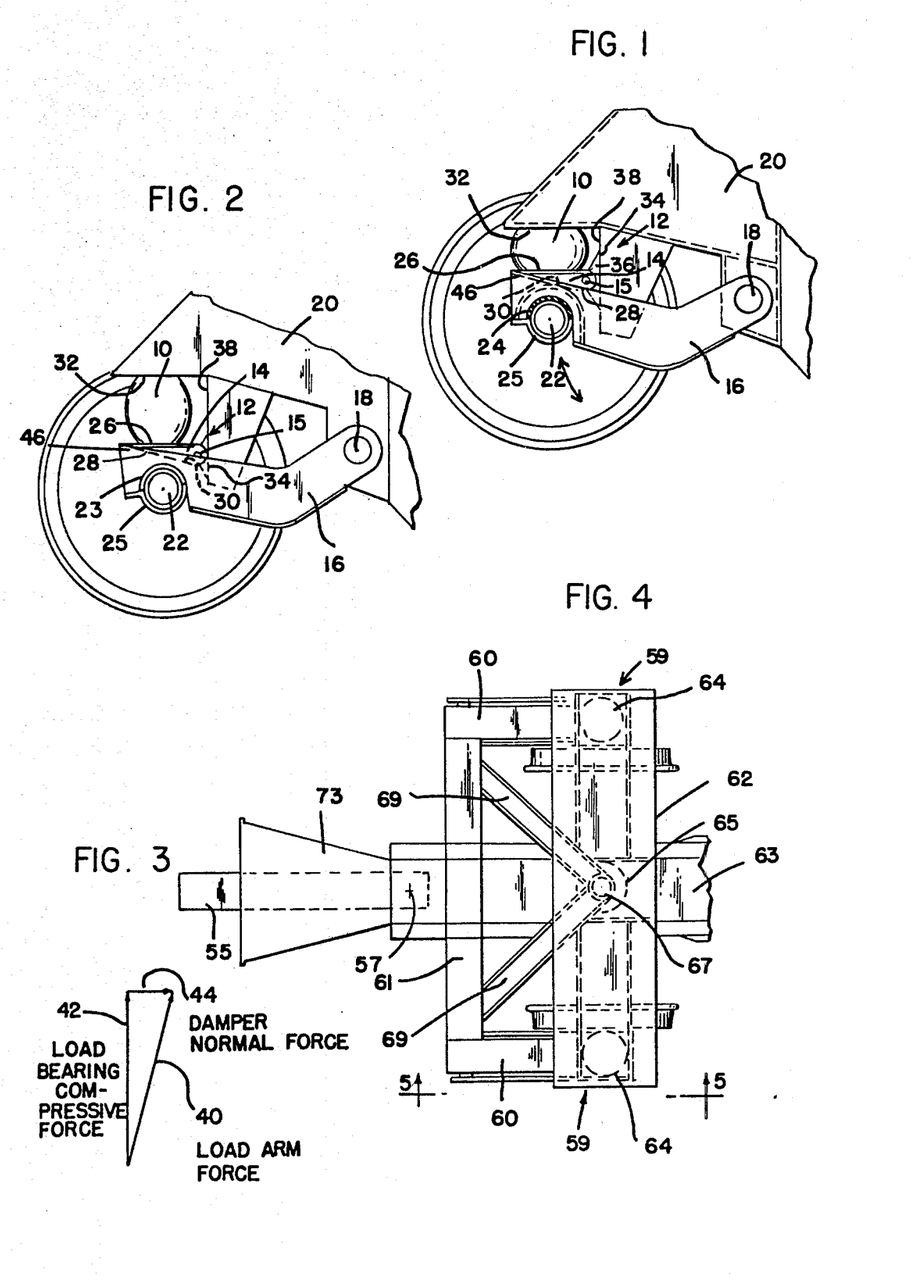
FIG. 1 is a side elevation of a fixed single axle railcar equipped with the suspension of this invention, depicting the suspension under a load condition.
FIG. 2 is a fragmentary side elevation generally similar to FIG. 1, depicting the FIG. 1 suspension under a light load condition.
FIG. 3 is a force diagram depicting the force transmission conditions present in the FIG. 1 suspension.
FIG. 4 is a top plan view of an articulated railcar truck equipped with the FIG. 1 suspension.

Referring first to FIGS. 1-3 of the drawings, the vehicular suspension of this invention includes a rod spring 10, frictional damper (generally referenced by numeral 12), and an operator 14 underlying the rod spring and connected to the frictional damper by pivot 15. A pivotally moveable load arm 16 supports the operator and rod spring. It is operator 14 which simultaneously applies respective forces to and controls the rod spring and damper—the forces being derived from a common load bearing force applied by arm 16.

According to the example depicted in FIGS. 1 and 2, the suspension is applied to a fixed single axle railcar. In that example, arm 16 is connected at its inner end by a low firction plastic bushed pivot 18 to a railcar body 20. The outer end of arm 16 supports one end of a railcar axle 22 via bearing adapter 23 (FIG. 2) and underlying bearing keeper 25. An elastomeric suspension pad 24 (FIG. 1) is interposed between and cushions loads transmitted between adapter 23 and arm 16. An identical independently moveable load arm and associated rod spring, frictional damper and operator are operatively associated with the body 20 at the other end of axle 22, not illustrated, and provide load bearing support therebetween.

Still referring to FIGS. 1 and 2, operator 14 has a tapered profile and forms upper and lower contact surfaces 26, 28, which diverge in a direction relatively toward damper 12, as shown (FIGS. 1, 2). The upper contact surface 26 is opposed to and bears against the lower rod spring load bearing surface in load transmitting relation therewith; but does not move or shift with respect thereto during loading, as will be described. The lower contact surface 28 bears against and is moveable with respect to an underlying inclined support surface 30 formed by the outer end of the load arm. Upper contact surface 26 is parallel to and opposes an upper load application surface 32 which, in the example, is formed by the vehicle body and corresponding bears against the upper rod spring load bearing surface. It is between surfaces 26 and 32 that the rod spring is compressed longitudinally during load application, as will be described.

In the example, the frictional damper is constituted by two relatively moveable parallel friction surfaces 34, 38. Surface 34 is formed by a conventional friction pad mounted by a friction shoe 36 which is pivotally connected by pin 15 to the relatively larger end of operator 14, as shown (FIGS. 1-2). Surface 38 is formed by a member which projects downwardly from the vehicle body. Surfaces 34, 38 are so disposed with respect to the operator 14 that they are maintained engaged with one another under no-load conditions (see FIG. 2). When urged together by a normal force applied by operator 14 during movement of arm 16 with respect to body 20, surfaces 34, 38 yield a vairable rate frictional damping force. In the example, surface 38 is so inclined with respect to the path of movement of the arm 16 that the frictional damping force produced during downward movement of the load arm exceeds that produced during upward movement thereof, as will be explained further hereinafter.

The operator 14 simultaneously applies perpendicular components of a force applied by the load arm to the rod spring and damper as depicted schematically in FIG. 3. Referring now to FIG. 3, a load bearing force is applied by the load arm 16 to the operator 14 via surfaces 28, 30 along an inclined vector 40 perpendicular to the face of contact surface 28. Operator 14 thereupon applies a first component of the load arm force via surface 26 to the rod spring along vector 42 which thus appears at the lower spring load bearing surface essentially as a load bearing compressive force only. Operator 14 simultaneously applies a second component of the load arm force via pivot 15 to the damper 12 along perpendicular vector 44. The latter force appears as a normal force for urging surfaces 34, 38 together.

Surfaces 34, 38 should be so disposed that the distance over which they must be moved together to obtain a frictional damping force of desired magnitude is sufficiently small (preferably negligible) that the operator 14 will not tend to shift laterally with respect to the rod spring during force application to an extent which would alter the static interfacing contact conditions therewith. As the material which constitutes surface 34 or surface 38 wears away, of course, the operator will assume a position at closer spacing thereto; however, movement of the operator in this fashion is so gradual that, in most practical cases, it has no effect on the contact conditions with the rod spring. Of particular significance is that the frictional damper will therefore be self-adjusting for wear throughout its service life.

To maintain these loading conditions in the FIG. 1 suspension, surface 30 is permitted to move or shift parallel to surface 28 during arcuate movement of the load arm. To this end, a layer of low friction material 46 may be interposed therebetween. Consequently, as the load arm pivots with respect to the body, the position of the operator 14 with respect to the rod spring is not altered in a plane which coincides with surface 26 and therefore that surface and the opposed interfacing lower load bearing surface of the rod spring remain in static interfacing engagement.

In the example, the friction surface 38 is inclined with respect to the path of movement of the load arm such that the frictional damping force obtained during downward movement of the load arm exceeds that obtained during upward movement thereof. More specifically, surface 38 is inclined at an acute angle with respect to the path of arcuate movement of the load arm depicted by the arrow in FIG. 1. Consequently, as the load arm 16 moves upward from its FIG. 2 position towards its FIG. 1 position, the force applied along FIG. 3 vector 44 appears as a normal force of decreasing magnitude as surface 38 slopes relatively away from the upward path of movement of arm 16 and operator 14. Conversely, as the load arm moves downward from its FIG. 1 position toward its FIG. 2 position, surface 38 approaches the path of movement of the load arm and hence of the operator and therefore the normal force obtained tends to increase in magnitude.

The suspension of this invention is depicted under two loading conditions in FIGS. 1-2, respectively. In FIG. 1, the suspension is depicted as it would appear under most ladened conditions; in FIG. 2 as it would appear under light load conditions. In FIGS. 1 and 2, the rod spring is deflected about 40-45% and 15-20% of its free standing height, respectively, and, in both cases, the unloaded sidewalls of the rod spring coincide with a generally circular profile. Under shock loads, the FIGS. 1-2 rod spring would be deflected 55-60% of its free standing height, although it can withstand even greater deflections without damage.

Figure 17:
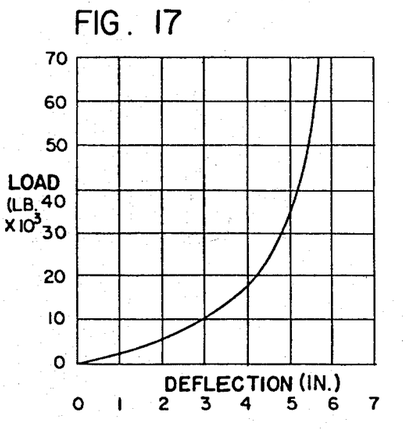
FIG. 17 is a graph of load versus deflection of a FIG. 13 rod spring.

As will be appreciated by comparing FIGS. 1 and 2, the areas of the respective load bearing surfaces of the rod spring tend to increase as the load bearing compressive forces applied increase in magnitude. This increase in load bearing surface area is obtained as portions of the spring side and end surfaces roll down into respective interfacing contact with the opposed surfaces 26, 32 illustrated. Consequently, the shape factor of the rod spring is correspondingly increased with progressively increasing applied load. The term "shape factor" as used herein may be defined as the ratio of the area of the spring load bearing surfaces to the area of the unloaded surfaces which are free to bulge in response to an applied load. As the shape factor increases, increasing compressive loads are required to attain a given deflection. That is, the spring becomes stiffer, or its resistance to further compression increases proportionately as its shape factor increases. Thus, it is possible, by forming the rod spring of a cross-sectional configuration which provides a load variable shape factor, to obtain a rod spring having a nonlinear or variable rate load deflection curve of the type depicted in FIG. 17. FIG. 17 depicts the load vs. deflection curve of an example rod spring having a major axis of 9.0 inches, a minor axis of 6.55 inches, and a length of 6.55 inches. Of particular significance to the present invention is that an elliptical rod spring cross section affords a deflection curve of this type, along with highly desirable suspension frequencies and reduced weight, as will be described hereinafter.

The faces of surfaces 26, 32 are, as described hereinabove, maintained parallel and respectively interface with the upper and lower rod spring load bearing surfaces. In the example of FIGS. 1 and 2, surfaces 26, 32 are so positioned that, when subjected to opposed vertical forces respectively applied by the vehicle body and the load arm, the rod spring is squeezed or compressed transversely therebetween, without rotation, along fixed position force vectors substantially perpendicular to the longitudinal axis of the body and coinciding with the major axis thereof. It will be understood, of course, that the direction of an applied load is not axial; that is, the rod spring is not loaded and thus does not function as an end loaded column and that the rod spring, being compressively loaded only, does not function as a shear spring, or as a combined shear-compression spring. Consequently, these interfacing surfaces are free of relative rotational, shifting or sliding movement during load application so that, as the rod spring is squeezed in the manner illustrated and described herein, torsional forces, shear forces, or force couples which tend to twist or rotate the rod spring about or parallel to its longitudinal axis are eliminated or minimized, with concomitant elimination or substantial minimization of destructive shear stresses and surface wear of the elastomeric material which comprises the rod spring.

Figure 14:
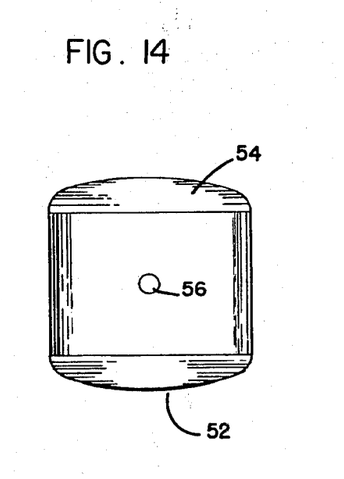
FIG. 14 is a top plan view of the FIG. 13 rod spring.
Figure 15:
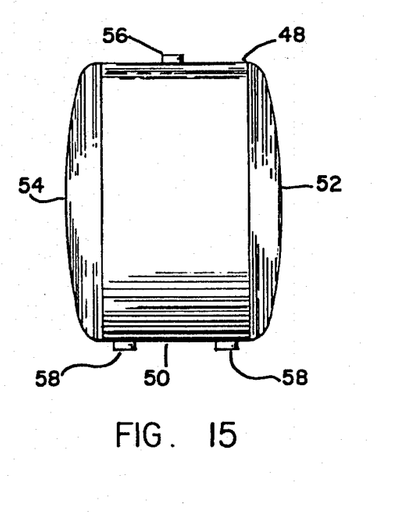
FIG. 15 is side elevational view of the FIG. 13 rod spring.
Figure 16:
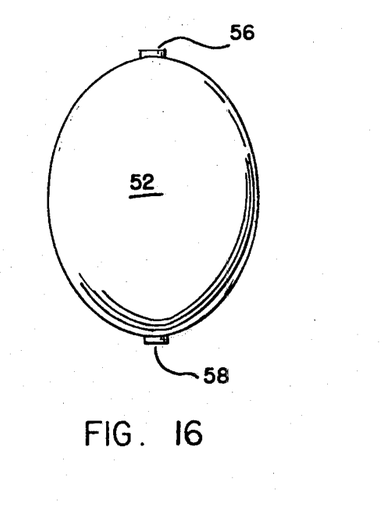
FIG. 16 is an end elevational view of the FIG. 13 rod spring.

The rod spring of this invention is illustrated in further detail in FIGS. 12-16. It is made up of a solid body of elastomeric material, preferably natural rubber. The upper and lower load bearing surfaces (referenced 48 and 50, respectively) are convex and preferably are curved about the longitudinal axis of the body. Likewise, the ends 52, 54 are convex and merge with the upper and lower load bearing surfaces, as well as the sides of the body, along curved corners, as shown (FIGS. 14 and 15). A single upper locating boss 56 is upstanding from the upper load bearing surface, and two lower locating bosses 58 are upstanding from the lower load bearing surfaces. The bosses are of appropriate outlines that they can register and engage with suitable recesses formed in surfaces 26, 32 of FIGS. 1 and 2 in order to prevent or substantially minimize the tendency for the rod spring to shift or rotate with respect thereto during compressive loading, and to facilitate positioning of the rod spring during assembly. The curved configuration of the load bearing surfaces allows the adjacent side walls to roll down gradually during compressive loading, with resultant lowering of stresses in the elastomeric material during loading, so that increased service life can be obtained. The rounded load bearing surfaces further maintain stability of the rod spring during increased deflections and therefore permit higher ellipse ratios (major/minor axis) to be used.

The ellipse ratio and length selected for the FIGS. 13-16 rod spring will depend upon desired suspension frequency, operational load range, weight, and service life. In general, the higher the ellipse ratio utilized, the lower the suspension frequency obtained for a given load. By utilizing a higher durometer elastomeric material, a higher suspension frequency is obtained; however, the effects of hysterisis tend to be pronounced for higher durometer elastomeric materials and therefore a rod spring composed thereof possesses a greater tendency to heat up after repeated load cycles. Consequently, for higher durometer elastomeric material, the service life of the rod spring tends to decrease correspondingly. By lengthening the rod spring, a higher load bearing capacity is obtained, although the spring frequency is increased somewhat due to increased resistance to roll down of the unloaded end surfaces.

In most practical applications, the rod spring preferably has an ellipse ratio less than about 2.5:1 and most preferably between about 1.1:1 and 2.2:1. Its length should at least equal the length of its minor axis and its durometer should be between about 40° and 70° International Rubber Hardness Degrees (IRHD). Six rod springs were constructed from 50° durometer natural rubber in accordance with the following specific, but not limiting, examples:

| ELLIPSE RATIO | LENGTH (IN) | FREQUENCY* (CPM) | LOAD* (LBS) | WEIGHT (LBS-OZS) |
| --- | --- | --- | --- | --- |
| 1.38:1 | 8.0 | 182.83 | 4780 | 5-4.5 |
| 1.38:1 | 4.0 | 178.71 | 2450 | 2-9.3 |
| 1.75:1 | 4.0 | 171.69 | 2140 | 2-1.3 |
| 2.0:1 | 4.0 | 170.61 | 1840 | 1-12. |
| 2.5:1 | 4.0 | 168.51 | 1680 | 1-7.5 |
| 2.0:1 | 2.75 | 170.39 | 1190 | 1-2.0 |

*At 40% deflection.

As will be appreciated from the above examples, ellipse ratio also has a significant effect upon the weight of the rod spring obtained, rod springs of higher ellipse ratios being significantly lighter in weight than those with smaller ellipse ratios. Conversely, as the ellipse ratio approaches 1:1, corresponding to a circular cross-section, the weight of the rod spring obtained for given frequency and load condition increases substantially.

Figure 5:
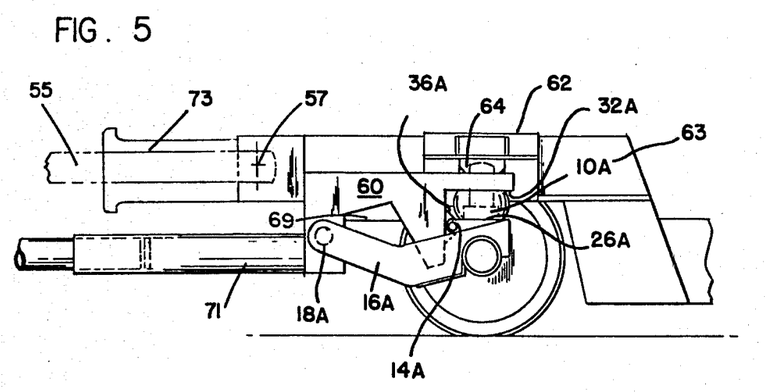
FIG. 5 is a section taken along the line 5—5 in FIG. 4.
Figure 23:
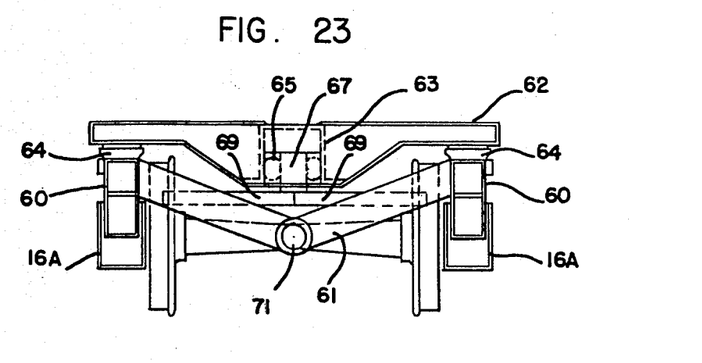
FIG. 23 is an end elevational view of the FIG. 4 articulated railcar taken along line 23—23 in FIG. 4.

Referring now to FIGS. 4, 5 and 23 of the drawings, the suspension of this invention is illustrated for application to an articulated railcar truck. The suspension of FIGS. 4, 5 and 23 is generally similar to that illustrated in FIGS. 1 and 2, the suspension including two identical suspension units 59, each made up of an independently movable load arm, rod spring and associated friction damper, except that each load arm acts between the respective truck side frame and the axle. Like parts of the FIGS. 4, 5, 23 suspension are designated with like reference numerals along with the suffix letter "A".

The illustrated articulated railcar truck includes two spaced apart parallel side frames 60 which are connected together at corresponding ends by a transverse member 61 having a depressed midsection generally V-shaped in side profile as shown (FIG. 23). The illustrated truck supports a car body bolster 62 which mounts a center sill 63 associated with a suitable car body. Side bearings 64 respectively mounted by the two side frames provide vertical load bearing support for the ends of bolster 62. Horizontal load bearing support for bolster 62 and swivel car body-truck connection is provided by an elastomeric spring ring 65, mounted by bolster 62, and a truck centering post 67, mounted by diagonal members 69. Members 69 transmit lateral and braking loads from member 61 to post 67. For articulated railcar operation, a connector 71 is mounted by member 61 adjacent its depressed midsection and extends between the illustrated truck and an adjacent truck (not shown) associated with a second car body (not shown) for preventing swivelling of the truck frames with respect to one another when negotiating curved track. Sill end 73 mounts a draw bar or coupler 55 at pivot 57 (FIGS. 4 and 5). Draw bar 55 acts between adjacent ends of the illustrated car body and the second car body (not shown) for transmitting buff and draft, or pushing and pulling, forces therebetween. When coupled, two such trucks behave as a self-steering double axle truck, the self-steering characteristics of which are described further hereinafter. One side bearing and spring ring suited for usage in the illustrated railcar are disclosed in U.S. Pat. No. 3,961,582, the disclosure of which is hereby incorporated by reference.

In the illustrated example, the truck pivot axis through spring ring 65 is offset longitudinally with respect to the draw bar pivot 57 and therefore the trucks will tend to shift longitudinally with respect to one another when the railcar negotiates curved track due to toggle action. In that example, connector 71 should permit such relative truck movement and, if desired, additionally may permit relative rotational movement of the trucks about a longitudinal axis therebetween, both as disclosed in the aforementioned U.S. Pat. No. 3,961,582. In other applications in which the draw bar pivot axis is located in vertical alignment with the truck pivot axis, connector 71 could be longitudinally rigid, while additionally permitting relative truck rotation if desired.

Figure 25:
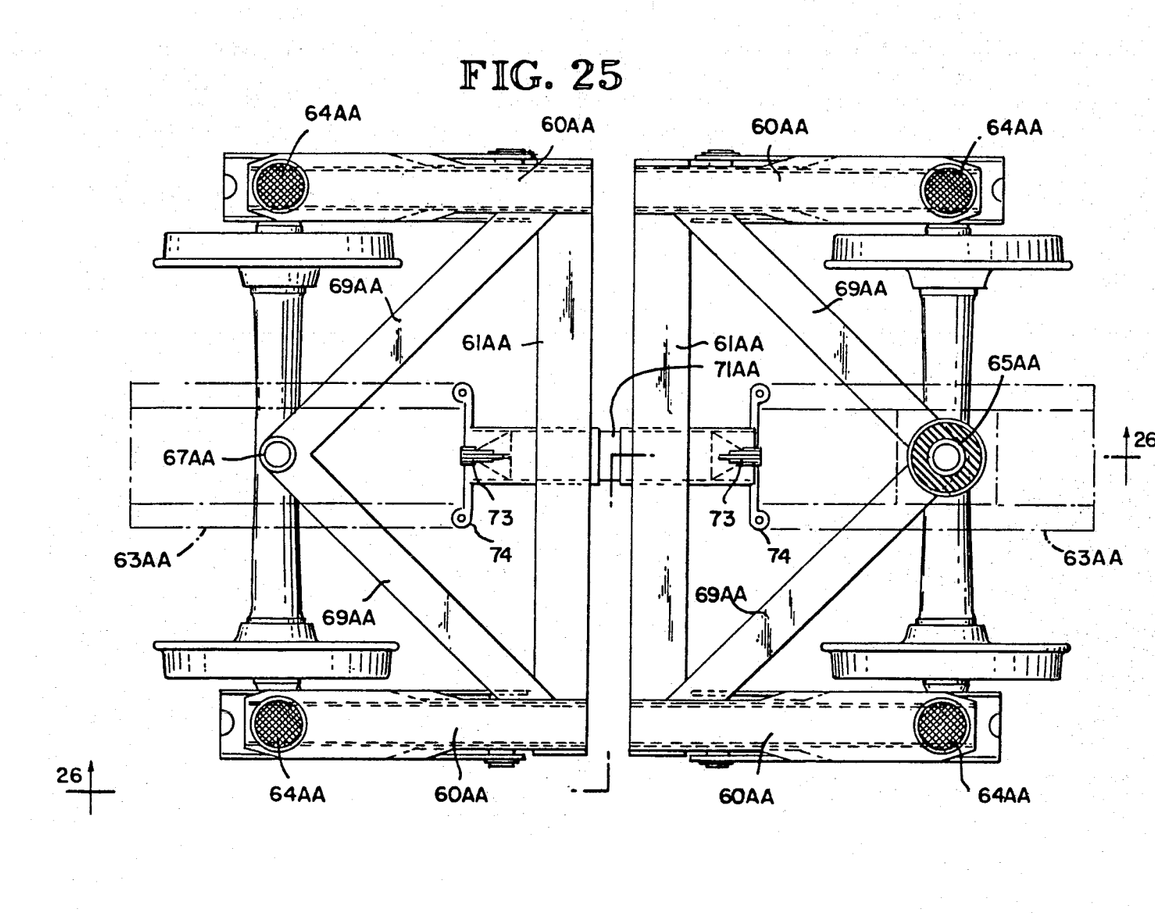
FIG. 25 is a top plan view of a modified form of the FIG. 4 truck, depicting two such trucks interconnected.
Figure 26:
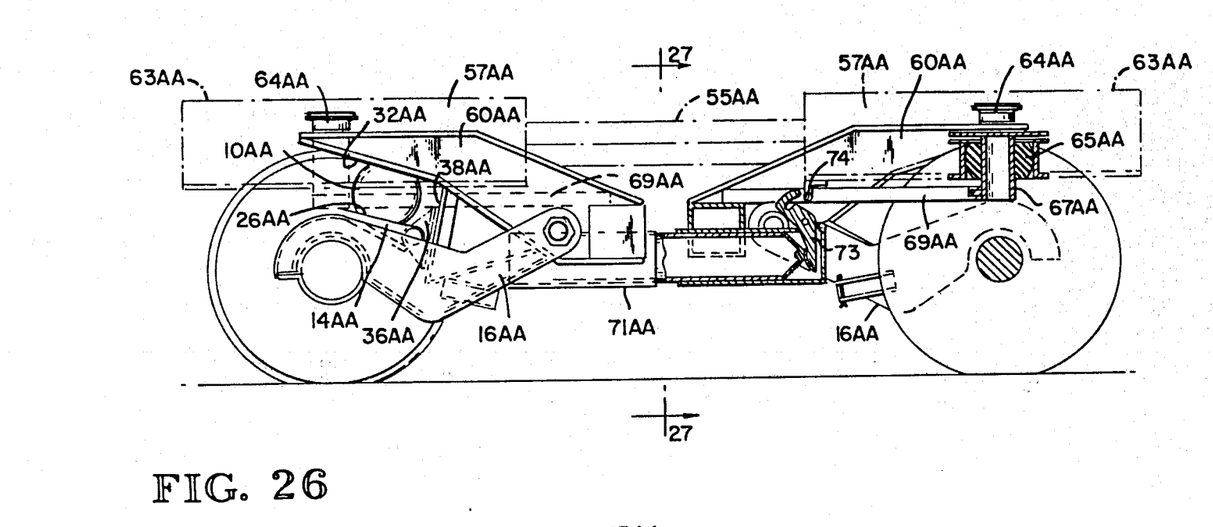
FIG. 26 is a section taken along the line 26—26 in FIG. 25.
Figure 27:
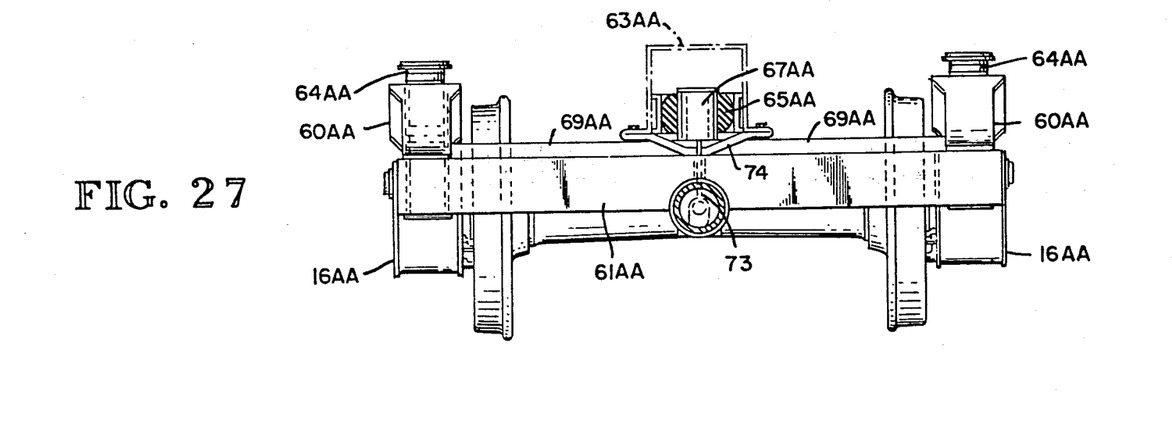
FIG. 27 is a section taken along the line 27—27 in FIG. 26.

A modified form of the FIG. 4 truck is illustrated in FIGS. 25–27 in which like parts are designated by the same reference numerals and the suffix letters "AA." The FIGS. 25–27 truck is generally similar to the FIG. 4 truck except that the side frames 60AA and members 61AA, 69AA, are of modified configurations. The FIGS. 25–27 truck additionally includes a pivoted latch 73 and a member 74 fixed to center sill 63AA to prevent swivelling of the trucks when connector 71AA is uncoupled. As illustrated in FIG. 26, latch 73 is so positioned in the path of movement of one telescopic element which makes up connector 71AA that it will be held in a retracted position averted from member 74. A spring not shown urges latch 73 into engagement with member 74 when connector 71AA is uncoupled.

Figure 6:
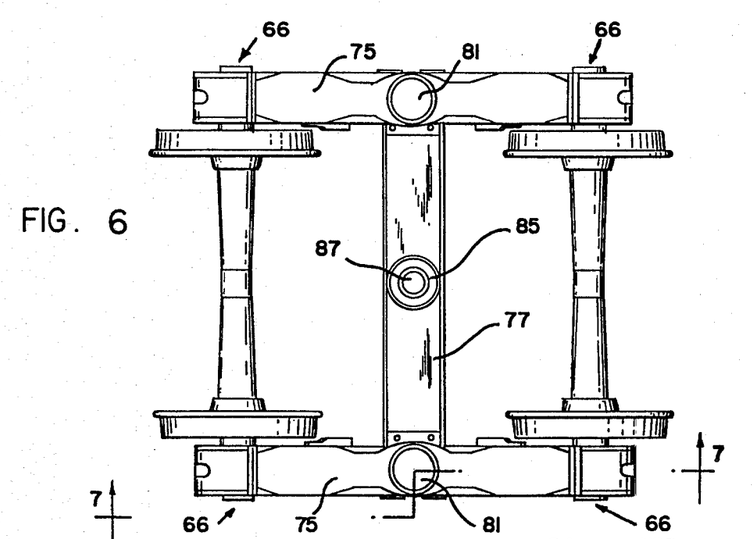
FIG. 6 is a top plan view of a double axle railcar truck equipped with the FIG. 1 suspension.
Figure 7:
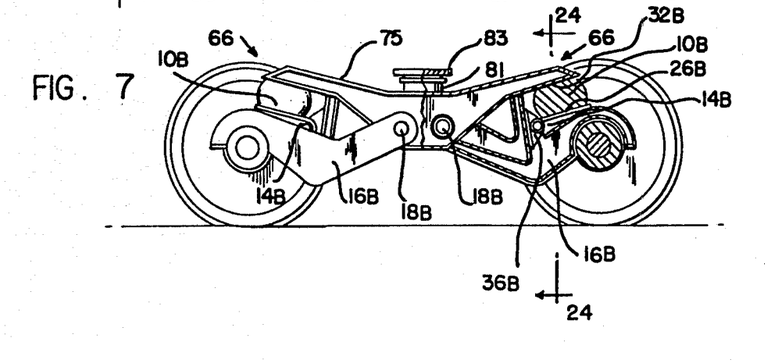
FIG. 7 is a section taken along the line 7—7 in FIG. 6.
Figure 24:
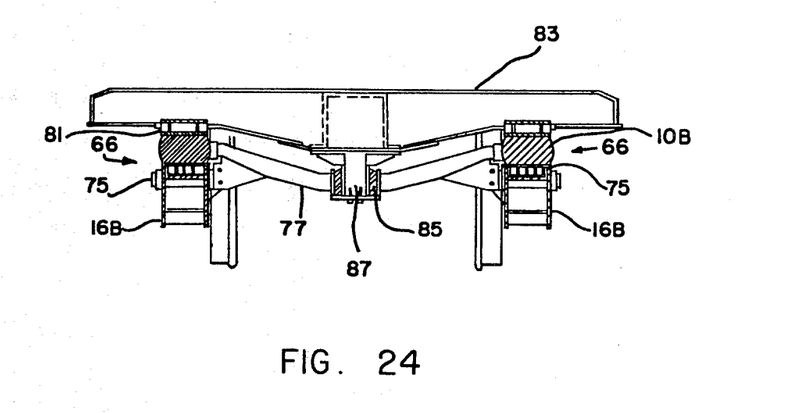
FIG. 24 is a section of the FIG. 7 double axle railcar truck taken along line 24—24 in FIG. 7.

Referring now to FIGS. 6, 7, and 24, the suspension of this invention is illustrated for application to a double axle truck. The FIG. 6, 7, and 24 suspension is generally similar to that illustrated in FIGS. 1 and 2, the suspension including four suspension units 66, each made up of an independently movable load arm, rod spring and associated frictional damper, except that each load arm acts between the respective truck side frame and axle. Like parts of the FIGS. 6, 7 and 24 suspension are designated with the same reference numerals and the suffix letter "B".

Figure 22:
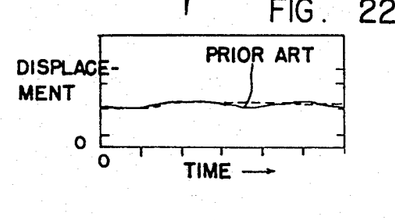
FIG. 22 is a graph of displacement versus time of a prior art suspension and the suspension of FIGS. 10-12.

The illustrated double axle truck includes two spaced apart parallel side frames 75 generally T-shaped in side elevation, as shown (FIG. 7), and generally similar to side frames 60AA of the FIG. 26 truck. The outer ends of each side frame are of reduced thickness and bear against respective underlying rod springs, while the intermediate portion thereof is of increased thickness. Two load arms 16B are mounted pivotally to this intermediate portion at two adjacent pivots 18B, as shown (FIG. 7). A transverse member 77 having, in the example, a depressed midsection generally V-shaped in profile, as shown (FIG. 22), is bolted to and connects the side frames adjacent the intermediate portions thereof. Member 77 is sufficiently flexible torsionally that the side frames 75 can rock relatively about the longitudinal axis of member 77 in respective vertical planes. Side bearings 81 respectively mounted by the two side frames provided vertical load bearing support for the ends of a body bolster 83. Horizontal load bearing support for bolster 83 and swivel car body-truck connection is provided by an elastomeric spring ring 85, mounted by member 77, and a truck centering post 87, bolted to bolster 83 as shown (FIG. 22). The bolt connections between the side frames and member 77, and between post 87 and bolster 83, preferably are made up of swaged or self-locking nuts which possess high vibration resistance. A side bearing and spring ring suited for usage in the illustrated truck are disclosed in U.S. Pat. No. 3,961,584, the disclosure of which is hereby incorporated by reference.

Figure 28:
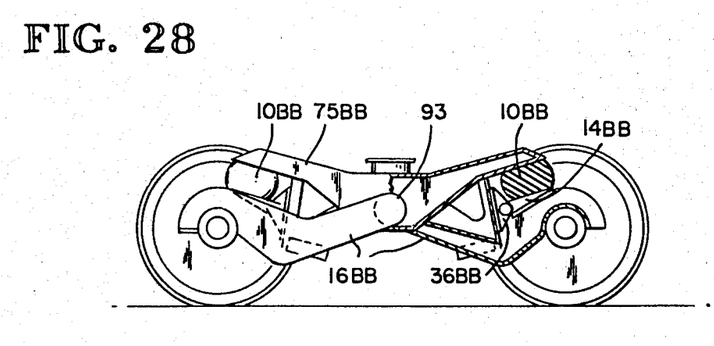
FIG. 28 is a side elevation generally similar to FIG. 7 of a modified form of the FIG. 7 truck.

Referring to FIG. 28, the load arms of the FIG. 7 double axle truck could be mounted by a common pivot 19 as depicted in FIG. 28, in which like parts bear like reference numerals and the suffix letters "BB". Pivot 93 could be fixed with respect to side frame 75BB, or it could be made shiftable with respect thereto by mounting it within a vertical slot formed therein. Refer for example to slot 174 described hereinafter with reference to FIG. 30.

Figure 8:
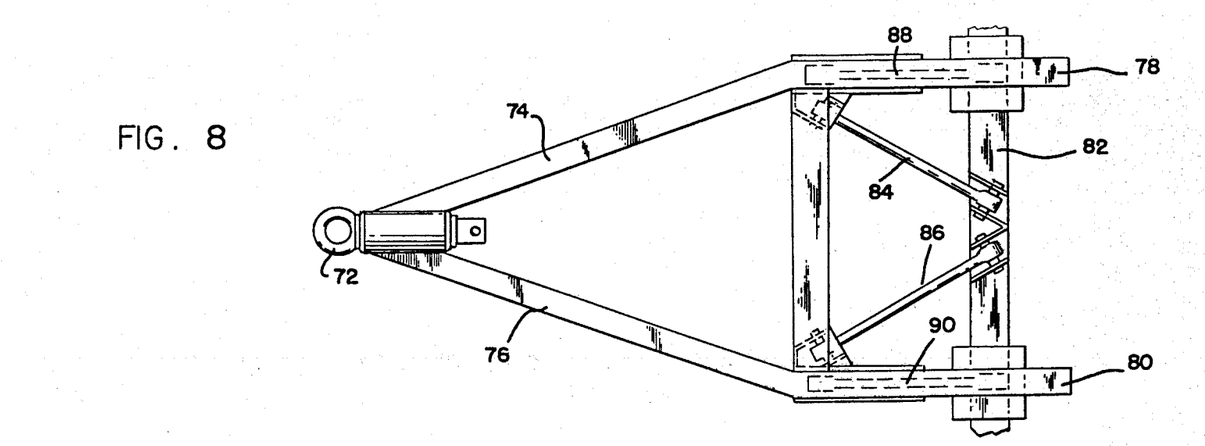
FIG. 8 is a top plan view of a rubber tired vehicle single axle converter dolly equipped with the FIG. 1 suspension.
Figure 9:
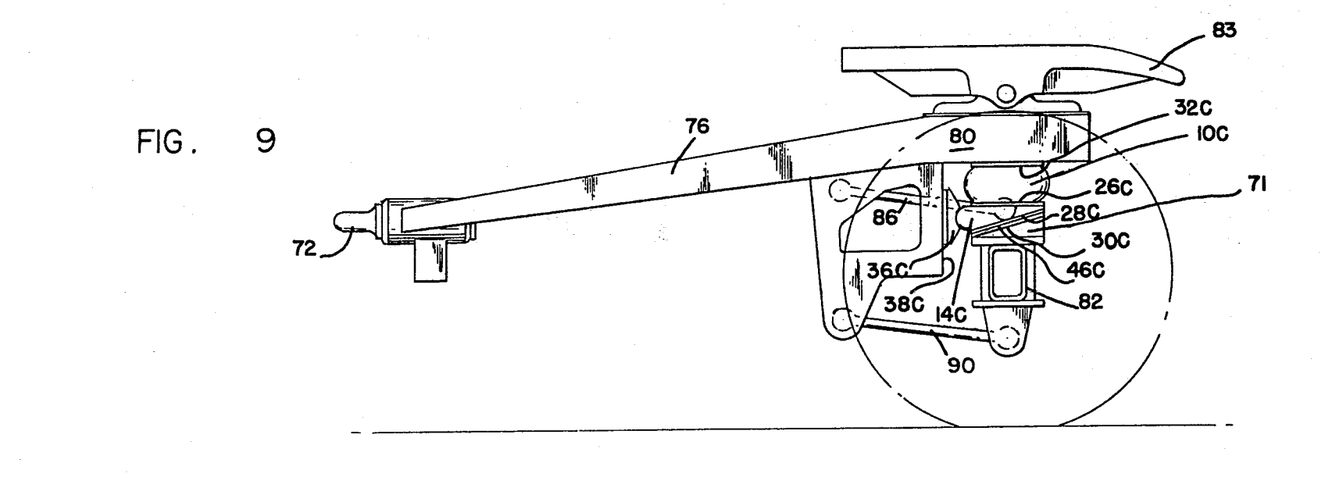
FIG. 9 is a side elevation of the FIG. 8 dolly.

Referring now to FIGS. 8 and 9, the suspension of this invention is illustrated for application to a single axle rubber tired vehicle. The FIGS. 8 and 9 suspension is generally similar to the suspensions illustrated and described hereinbefore, like parts being designated with the same reference numerals and the suffix letter "C", except that it includes a separate member 71 which forms the inclined support surface 30C.

In the illustrated example of FIGS. 8 and 9, the vehicle is constituted by a trailer converter dolly which includes an eye or coupler 72 adapted for connection with a conventional trailer hitch, and two diverging frame members 74, 76 which terminate in spaced apart parallel portions 78, 80 in overlying relation with the vehicle axle 82. A fifth wheel 83 is mounted by portions 78, 80, as shown (FIG. 9). The axle 82 mounts member 71 and is supported with respect to members 74, 76 by a parallelogram linkage. This linkage is made up of two coplanar upper control rods 84, 86 which converge from pivot mounts on portions 78, 80 toward pivot mounts adjacent the center of axle 82, and two co-planar lower control rods 88, 90 likewise mounted but extending parallel to and underlying portions 78, 80, as shown (FIGS. 8 and 9).

Figures 10, 11, 12:
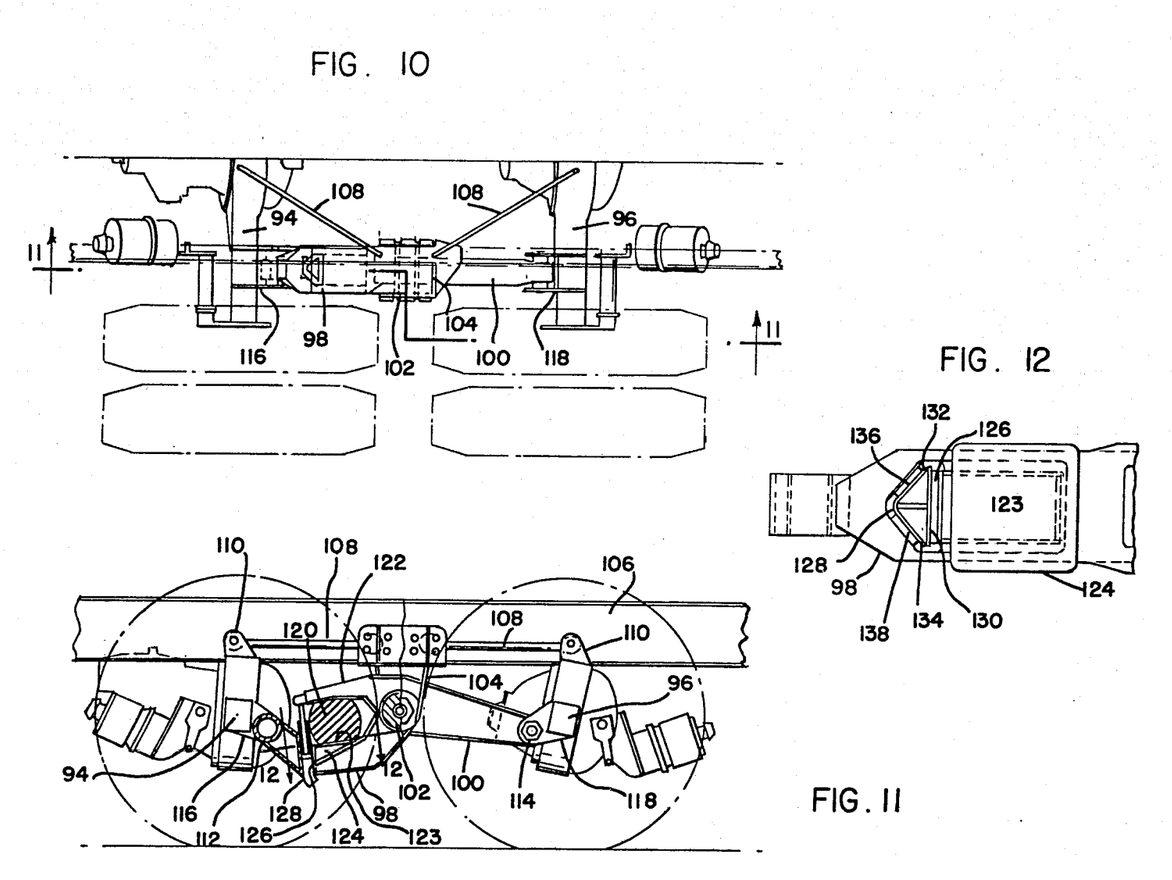
FIG. 10 is a fragmentary top plan view of an tandem axle rubber tired vehicle equipped with the FIG. 1 suspension.
FIG. 11 is a section taken along the line 11—11 in FIG. 10.
FIG. 12 is a section taken along the line 12—12 in FIG. 11.
Figure 13:
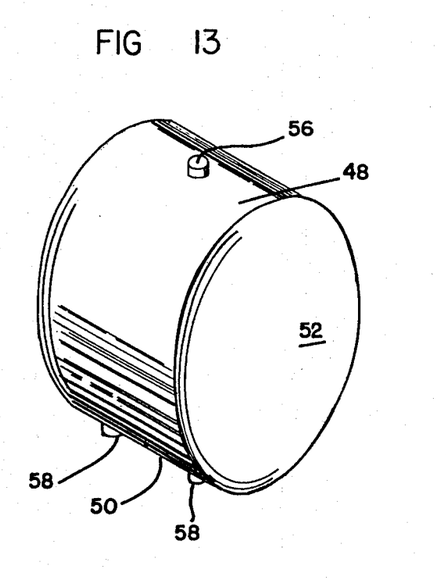
FIG. 13 is a perspective view of an elliptical cross-section rod spring according to this invention.

Referring now to FIGS. 10 and 11, a tandem axle rubber tired vehicle suspension is illustrated. This suspension is generally similar to the suspensions illustrated in FIGS. 1–9, except that the rod spring is loaded between opposed relatively moveable portions of two commonly pivoted load arms. Two sets of load arms (only one set illustrated) support the ends of the tandem axles 94, 96. A single rod spring constitutes the sole load bearing spring element for each load arm set. Only one load arm set and the associated rod spring, damper and other suspension components are illustrated and described herein, it being understood that the other load arm set and respectively associated suspension components are identical.

With further specific reference to FIGS. 10 and 11, the suspension includes an outer or leading load arm 98 and an inner or trailing load arm 100. These arms are commonly pivoted intermediate their ends by a common center bushing 102. The bushing is mounted by a saddle 104 which is secured to and projects downwardly from the vehicle frame 106. The upper portions of the saddle are respectively connected by torque rods 108 to upstanding axle bowl brackets 110 associated with the axles 94, 96, as is customary in such suspensions. The outer ends of the load arms terminate in respective rubber bushings 112, 114 which are connected by axle brackets 116, 118 to the axles as shown.

The FIGS. 10 and 11 suspension includes an eliptical cross section rod spring 120 which is generally similar to the rod springs illustrated and described hereinbefore. The upper load bearing surface of the rod spring bears against and interfaces with the surface formed by an overlying extending portion 122 of arm 100, as shown. The lower rod spring load bearing surface is carried on opposed surface 123 formed by a moveable damper bracket 124. The lower surface of the damper bracket is inclined and slideably engages a correspondingly inclined surface formed by arm 98 and is moveable with respect thereto during compressive loading of the rod spring in a manner generally similar to operator 14 illustrated and described hereinabove with respect to FIGS. 1 and 2. The relatively thicker end of the damper bracket supports a damper pad 126 composed of appropriate friction shoe material. This pad bears against one surface of a tubular open ended damper element 128 which is mounted by the distal end of arm portion 122, as shown (FIG. 9). One side of the damper element forms a substantially planer surface 130 (see FIG. 12) which opposes and engages pad 126 in sliding relation as the arms 98, 100 pivot relatively. The opposite side of the damper element is generally V-shaped in cross section (see FIG. 10) and forms two mutually inclined surfaces 132, 134 which respectively oppose two additional damper pads 136, 138 mounted by arm 100, as shown (FIG. 12). The damper bracket 124 urges pads 126, 136 and 138 into frictional engagement with surfaces 130, 132 and 134, respectively, when subjected to an applied load produced by arms 98 and 100, as was the case with the FIGS. 1, 2 operator 14.

Figure 29:
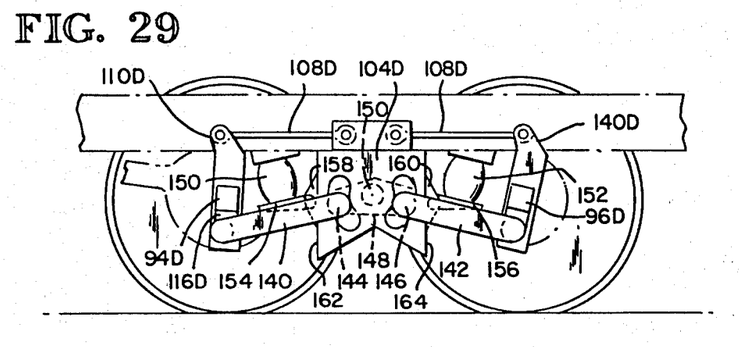
FIG. 29 is a side elevation generally similar to FIG. 11 of a modified form of the FIG. 11 rubber tired vehicle.

A modified form of the FIG. 11 suspension is depicted in FIG. 29 in which like parts bear like reference numerals and the suffix letter "D". The FIG. 11 suspension includes two load arms 140, 142, the outer ends of which are connected by axle brackets 116D and 118D to axles 94D and 96D, respectively. The inner ends of arms 140, 142 are connected pivotally at 144, 146 to respective ends of an equalizer beam 148. This beam is mounted pivotally intermediate the arm pivots at 150 by saddle 104D. Rod springs 150, 152 are carried by operators 154, 156 which are supported by the arms 140, 142, respectively, as in the FIG. 1 suspension. Operators 154, 156 likewise urge friction shoes 158, 160 against friction surfaces 162, 164. A generally similar suspension made up of two load arms and an equalizer beam could be utilized in the FIGS. 6, 7 truck.

Figure 30:
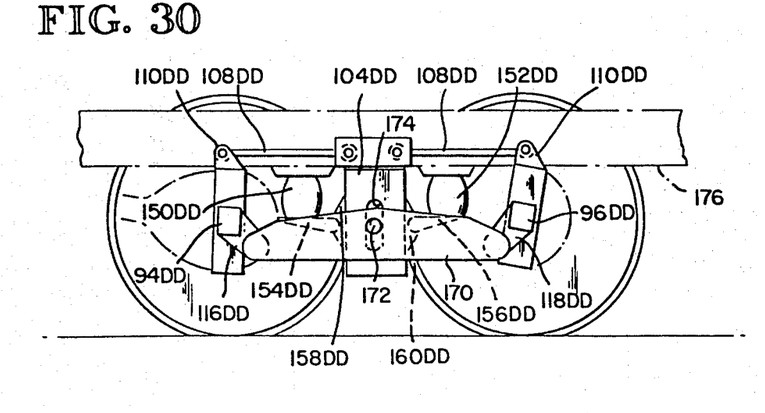
FIG. 30 is a side elevation generally similar to FIG. 11 of another modified form of the FIG. 11 rubber tired vehicle.

A second modified form of the FIG. 11 suspension is depicted in FIG. 30, in which parts corresponding to parts of the FIG. 11 or FIG. 29 suspensions bear like reference numerals and the suffix letters "DD". A single load arm 170 is connected at its ends by axle brackets 116DD, 118DD to axles 94DD and 96DD and carries rod springs 150DD and 152DD. A pin 172 which rides in a vertical slot 174 formed by saddle 104DD supports arm 170 intermediate its length. Consequently, the arm can slide vertically along slot 174 with respect to saddle 104DD for load distribution into frame rail 176.

Figure 18:
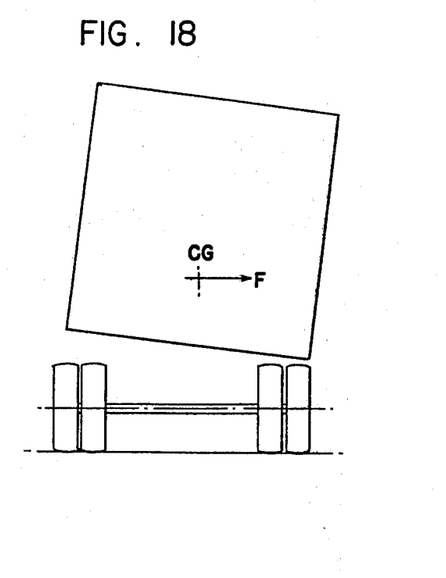
FIG. 18 is a schematic depicting centrifugal loading conditions applied to the FIGS. 10-12 suspension when negotiating a curve.
Figure 19:
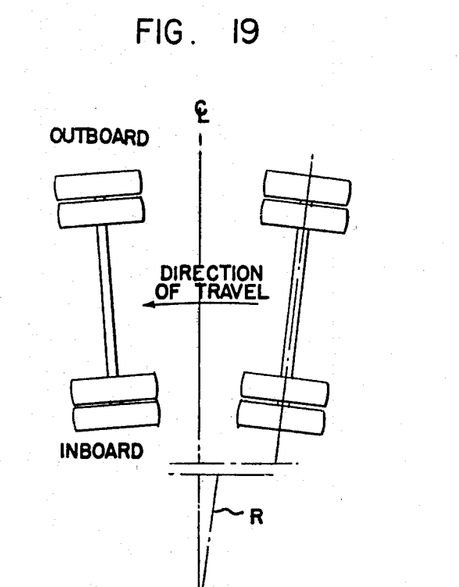
FIG. 19 is a schematic depicting self-steering of the FIGS. 10-12 suspension produced by the FIG. 18 loading conditions.

Referring now to FIGS. 18 and 19, the suspensions illustrated in FIGS. 4–7, 10–12, and 23–30 afford self-steering when cornering due to independent movement of the load arms in response to application of centrifugal forces, as will be described. FIGS. 18 and 19 depict self-steering of the FIGS. 10–12 tandem axle suspension, although the suspensions illustrated in FIGS. 4–7 and 23–29 will accomplish generally similar self-steering when negotiating curves. The single axle suspensions of FIGS. 1, 2, 8 and 9 afford self-steering when mounted at opposite ends of a vehicle.

With further reference to FIGS. 18 and 19, as a rubber tired vehicle equipped with the FIGS. 10–12 suspension negotiates a corner when traveling in the direction indicated by the arrow in FIG. 19, centrifugal force with respect to the center of gravity tends to cause the overhead car body to tilt outwardly as illustrated in FIG. 18. Consequently, the load bearing force applied to the suspension elements associated with the outboard wheels tends to increase, while simultaneously therewith the load bearing force applied to the suspension elements associated with the inboard wheels tends to decrease. The outboard load arms therefore tend to spread apart the outboard ends of the axles, while simultaneously the inboard load arms tend to draw the inboard ends of the axles together, as depicted in FIG. 19. Consequently, the axles assume respective radial positions with respect to the curve until the centrifugal loading conditions outlined hereinabove are removed when the vehicle resumes straight line travel.

Figure 20:
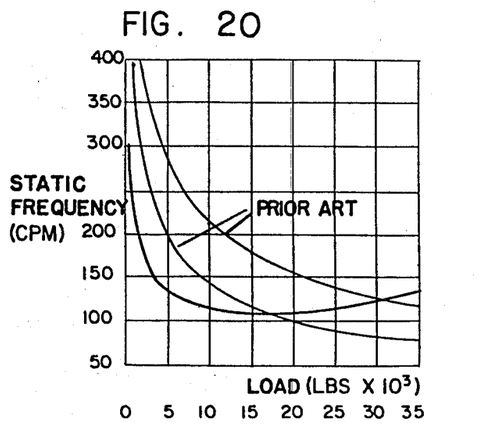
FIG. 20 is a graph of static frequency versus load of two prior art tandem axle suspensions and the FIGS. 10-12 suspension.

Referring now to FIG. 20, the suspension of this invention exhibits substantially constant frequency over a predetermined range of applied loads. FIG. 20 depicts the spring frequencies obtained under typical loading conditions with respect to the tandem axle suspension illustrated in FIGS. 10–12, although the remaining suspensions are capable of providing generally similar frequency curves. FIG. 20 also depicts the frequency curves for two prior art tandem axle suspensions. As will be appreciated, the frequency curve obtained with the suspension of this invention provides substantially constant spring frequency between the load limits indicated.

Figure 21:
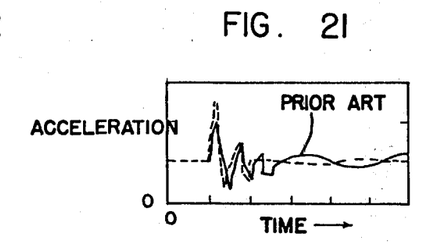
FIG. 21 is a graph of acceleration versus time of a prior art suspension and the suspension of FIGS. 10-12.

FIGS. 21 and 22 depict further operational aspects of the FIGS. 10-12 tandem axle suspension and likewise are representative of the operational characteristics of the remaining suspensions illustrated and described herein. FIGS. 21 and 22 also depict corresponding operational characteristics of a prior art walking beam suspension equipped with leaf springs.

Referring first to FIG. 21, the suspension of this invention exhibits with fewer tire bounces (2 versus 3) and lower magnitude follow-up acceleration than the prior art suspension in response to an impact with a two inch high, six inch long hump at 50 m.p.h. Referring to FIG. 22, the suspension of this invention also exhibits less deflection and more rapid damping than the prior art suspension in response to the same impact conditions.

While several preferred embodiments of the invention have been illustrated and described herein, variations will become apparent to one of ordinary skill in the art. For example, the FIG. 11 suspension could be adapted for use with two rod springs and two friction dampers by providing two crossed arms, each having a lower portion similar in outline to the lower portion of arm 98 for carrying a rod spring and operator to one side of the arm pivot, and an upper portion similar in outline to portion 122 for mounting a damper and loading a rod spring to the opposite side of the arm pivot. Accordingly, the invention is not to be limited to the specific embodiments illustrated and described herein, and the true scope and spirit of the invention are to be determined by reference to the appended claims.

The embodiments of the invention in which an exclusive property or privilege is claimed are defined as follows:

1. A rubber tired vehicle suspension, comprising:
   moveable load arm means for supporting an axle with respect to a rubber tired vehicle body;
   a spring element;
   means connected with the body forming a frictional damping surface;
   a damping element; and
   force resolving means carried by said load arm means between the axle and the body for supporting said spring element in load bearing relation with the body and for supporting said damping element in frictional force generating relation with said frictional damping surface such that said spring element will be compressed while simultaneously therewith said damping element will be urged into frictional engagement with said frictional damping surface in response to relative movement of the body and said load arm means.

2. The suspension of claim 1, wherein said friction surface is so inclined with respect to the path of movement of said load arm means that the frictional damping force produced during movement of said load arm means in one direction exceeds the frictional damping force produced during movement thereof in a direction opposite said one direction.

3. The suspension of claim 1, wherein said load arm means include a parallelogram linkage pivoted at one end and connected to the axle at its other end, said linkage carrying said spring element adjacent its other end.

4. The rubber tired vehicle suspension according to claim 1 wherein said load arm means includes an axle carrying member and a parallelogram linkage pivotally connected between said body and said axle carrying member.

5. The suspension of claim 1, wherein said spring element comprises an elastomeric rod spring of elliptical cross-section having a longitudinal axis normal to the axes of the ellipse and mounted so as to receive compressive loading transverse to said longitudinal axis only.

6. The suspension of claim 5, wherein said force resolving means includes support means for supporting and transmitting forces to said damping element and tapered operator means operatively associated with said support means for transmitting force to said support means and said rod spring, said tapered operator means including two contact surfaces, one contact surface being slideably mounted with respect to said moveable load arm means, the other contact surface underlying one load bearing surface of said rod spring in contact therewith.

7. The suspension of claim 6, further comprising means interposed between said one contact surface and said support means for permitting low friction relative movement therebetween during movement of said load arm means.

8. The suspension of claim 1 wherein said load arm means include a load arm assembly pivotally connected at its ends to corresponding ends of two tandem axles, respectively, and support means pivotally mounted by the body for supporting said assembly intermediate its ends, said assembly carrying two such spring elements at locations spaced on either side of said support means.

9. The suspension of claim 8, wherein said load arm assembly includes two arms and said support means include an equalizer beam pivoted at its ends to the ends of both said arms and pivoted to the body intermediate its ends.

10. The suspension of claim 8, wherein said load arm assembly includes a single beam member and said support means include means pivotally mounted by the body and connected to said beam member intermediate its length for permitting said beam member to shift vertically with respect to the body.

11. The rubber tired vehicle suspension according to claim 1 wherein said frictional damping surface is inclined at an acute angle with respect to the arcuate path of movement of said load arm means.

12. The rubber tired vehicle suspension according to claims 1 or 11 wherein said force resolving means includes a tapered operator slideably connected to said load arm means for causing a load bearing compressive force transmitted from said load arm means to be applied as a first component to said spring element as a compressive force and as a second component to said damping element as a force normal to said frictional damping surface.

13. The rubber tired vehicle suspension according to claim 12 wherein said spring means includes an elastomeric spring element positioned to receive compressive loads.

14. The rubber tired vehicle suspension according to claim 1 wherein said load arm means includes an equalizer beam pivotally connected to said body intermediate its ends and two load arms pivotally connected adjacent their respective first ends to opposite ends of said equalizer beam adjacent opposite ends of said equalizer beam and to corresponding first ends of two tandem axles, respectively, adjacent the second ends thereof.

15. The rubber tired vehicle suspension according to claim 1 wherein said load arm means includes a load arm slideably connected to said body intermediate its ends and pivotally connected to corresponding first ends of two tandem axles adjacent its ends.

16. The rubber tired vehicle suspension according to claim 14 or 15 further including means interconnecting said load arms to said body such that the distance between said first ends of the two tandem axles increases in response to increased vertical loading transmitted by said body to said load arms.

17. A variable rate friction damper for a rubber tired vehicle suspension, comprising:
   means connectable with a rubber tired vehicle body forming a frictional damping surface;
   a damping element;
   spring means for supporting said body; and
   force resolving means positionable in load transmitting relation between a vehicle axle and the body for supporting said spring means in load bearing relation with the body and for supporting said damping element in frictional force generating relation with said frictional damping surface such that said spring means will be compressed while simultaneously therewith said damping element will be urged into frictional engagement with said frictional damping surface in response to relative movement of the body and the vehicle axle.

18. A rubber tired vehicle suspension having two relatively moveable arm assemblies, comprising:
   moveable load arm means for supporting one of the two assemblies;
   a spring element;
   means in force transmitting relation with the other of the two assemblies forming a frictional damping surface;
   a damping element; and
   force resolving means carried by said load arm means between the two assemblies for supporting said spring element in load bearing relation with said other assembly and for supporting said damping element in frictional force generating relation with said frictional damping surface such that said spring element will be compressed while simultaneously therewith said damping element will be urged into frictional engagement with said frictional damping surface in response to relative movement of the two assemblies.

19. The suspension of claim 18, wherein said load arm means include a load arm pivotally mounted at one end from said other assembly, and carrying said spring element adjacent to its other end.

20. The suspension of claim 19, wherein said other assembly includes a second load arm, and means pivotally mounting the first-mentioned load arm at said one end, and said second load arm intermediate its ends for rotative movement with respect to a common pivot axis to respectively support corresponding first ends of two tandem axles, wherein said spring element is compressed between opposed portions of said load arms in response to relative rotative movement thereof.

* * * * *